United States Patent
Miller

(10) Patent No.: US 7,331,642 B2
(45) Date of Patent: Feb. 19, 2008

(54) METHOD FOR APPLYING TORQUE OVERLAY DURING SPLIT-MU BRAKING CONDITIONS

(75) Inventor: Joe Miller, Farmington Hills, MI (US)

(73) Assignee: Kelsey-Hayes Company, Livonia, MI (US)

( * ) Notice: Subject to any disclaimer, the term of this patent is extended or adjusted under 35 U.S.C. 154(b) by 175 days.

(21) Appl. No.: 11/170,805

(22) Filed: Jun. 30, 2005

(65) Prior Publication Data
US 2007/0001510 A1    Jan. 4, 2007

(51) Int. Cl.
*B60T 8/60* (2006.01)

(52) U.S. Cl. ..................... 303/148; 303/149
(58) Field of Classification Search ......... 303/146–150
See application file for complete search history.

(56) References Cited

U.S. PATENT DOCUMENTS

| | | |
|---|---|---|
| 6,959,970 B2 * | 11/2005 | Tseng ................... 303/146 |
| 6,968,920 B2 | 11/2005 | Barton et al. |
| 7,035,726 B2 * | 4/2006 | Sakata .................. 303/148 |
| 7,070,247 B2 * | 7/2006 | Offerle ................. 303/146 |
| 7,165,818 B2 * | 1/2007 | Iwasaki et al. ........ 303/146 |

* cited by examiner

*Primary Examiner*—Melanie Torres
(74) *Attorney, Agent, or Firm*—MacMillan, Sobanski & Todd, LLC

(57) ABSTRACT

A method is provided for vehicle stability control of a vehicle where the vehicle includes a slip control braking system that applies independent braking pressure to respective vehicle brakes of the vehicle. The vehicle further includes a steering system for applying steering intervention for stability control. The method includes detecting a split-mu braking condition and applying a steering assist torque to the steering system. A determination is made whether a steering wheel angle condition is within a predetermined threshold. An aggressive braking strategy is applied if the steering wheel angle condition is within the predetermined threshold, else applying a non-aggressive braking strategy.

17 Claims, 3 Drawing Sheets

METHOD FOR APPLYING TORQUE OVERLAY DURING SPLIT-MU BRAKING CONDITIONS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates to a vehicle stability control system, and more specifically, to an integrated system utilizing steering and braking controls.

2. Description of the Related Art

Vehicle braking systems are known to include antilock braking (ABS), traction control (TC), and vehicle stability control (VSC). ABS systems monitor the wheel rotational behavior and selectively apply and relieve hydraulic brake fluid pressure in the respective vehicle brakes via electronically controlled isolation valves and dump valves for maintaining wheel speed within a selected slip range while maintaining optimum braking forces. Such controlled braking may be applied on an individual vehicle wheel, a combination of vehicle wheels, or to all vehicle wheels.

In traction (TC) control systems, additional valves are added to an existing ABS system to control wheel speeds during vehicle acceleration. Excessive wheel speed during vehicle acceleration may produce wheel slip and loss of traction. When this condition is sensed, braking pressure is automatically supplied to the vehicle brakes of the slipping wheels to reduce slippage and regain uniform traction between the wheels.

A vehicle stability control (VSC) braking system is used to improve the stability of a vehicle by counteracting forces otherwise leading to the instability through the application of selective brake actuation. Such instability can be caused during vehicle motion such as cornering. Each of the above systems utilize braking as a means to improve vehicle stability for a given vehicle instability behavior.

Control assist steering systems have been developed to aid a driver in steering efforts for controlling the stability of a vehicle. For example, if a vehicle instability is occurring from an oversteer or understeer condition, sensors detect the instability condition of the vehicle. A controller within the control assist steering system generates a steering torque output in the direction required for correcting the instability of the vehicle. This control action is performed prior to the driver identifying and reacting to the instability condition.

Some systems have utilized both the VSC system through braking and the control assist steering system to cooperatively correct the instability condition of the vehicle and shorten the stopping distance of the vehicle as opposed to using either the VSC or control assist steering system individually.

One such instability condition in which VSC and control assist steering may work in cooperation with one another is when a vehicle is driving along a split-mu surface. That is, the road has a high-mu surface (e.g., dry surface) under the wheels on one side of the vehicle and a low-mu surface (e.g., ice) under the wheels on the opposite side of the vehicle. Performing a vehicle stability control operation would exert a high braking force on the front vehicle wheel in contact with the high-mu surface and a low braking force on the remaining wheels. The vehicle would tend to yaw about the center axis of the vehicle in a direction of the wheel with the high braking force. For example, a high braking force on the front-left wheel (high-mu surface) would cause the vehicle to yaw counterclockwise. The control assist steering system would generate a steering torque to create a yaw force in the opposing direction (clockwise). If however, the driver of the vehicle does not allow the control assist steering system to directionally correct the steering wheel angle, and if the high braking force is maintained on the front-left wheel, the vehicle may have a tendency to spin out.

SUMMARY OF THE INVENTION

The present invention provides the advantage of cooperatively utilizing braking controls from a slip control braking system and a torque overlay from a control assist steering system to provide stability control when traveling on a split-mu road surface. More importantly, a determination is made in response to steering wheel angle feedback of whether an aggressive braking strategy or non-aggressive split-mu braking strategy may be applied while maintaining vehicle stability. This is because steering wheel angle always precedes vehicle yaw due to the lag of the linkage and tires.

In one aspect of the present invention, a method provides vehicle stability control for a vehicle where the vehicle includes a slip control braking system for applying independent braking pressure to respective vehicle brakes of the vehicle. The vehicle further includes a steering system for applying steering intervention for stability control. The method includes detecting a split-mu braking condition and applying a steering assist torque to the steering system. A determination is made whether a steering wheel angle condition is within a predetermined threshold. An aggressive braking strategy is applied if the steering wheel angle condition is within the predetermined threshold, else applying a non-aggressive braking strategy.

DETAILED DESCRIPTION OF PREFERRED EMBODIMENTS

Figure 1:
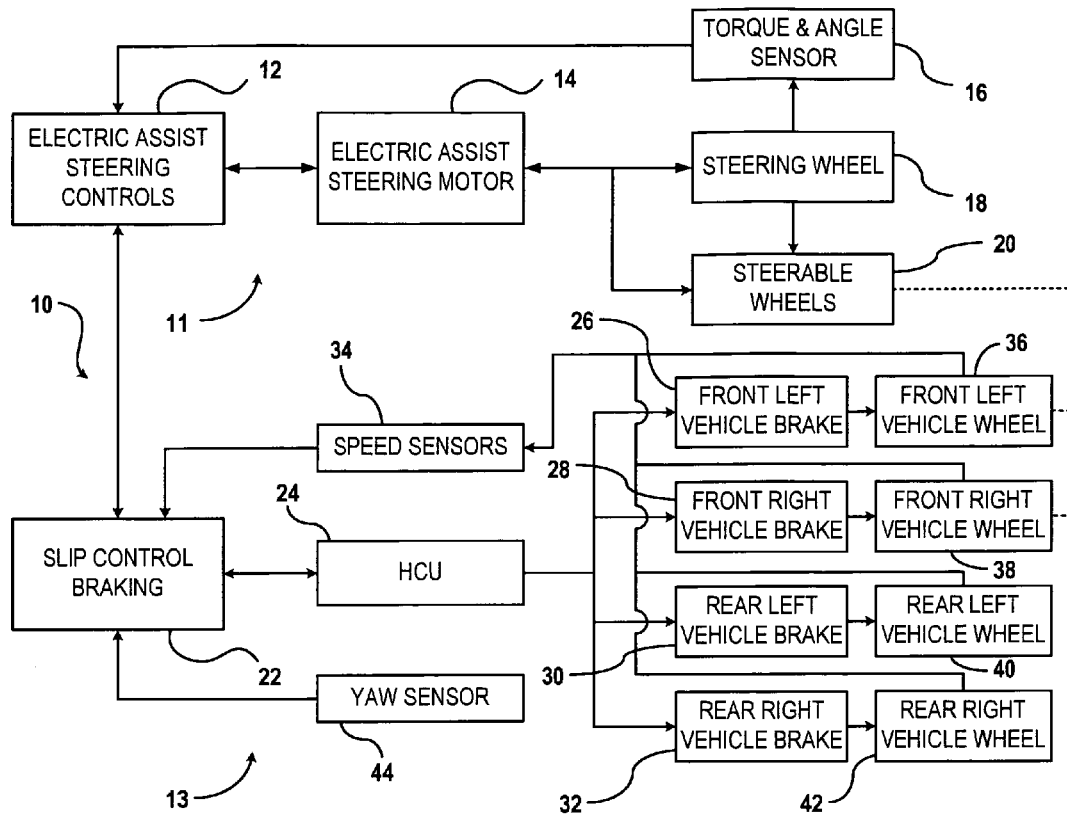
FIG. 1 is a schematic of a control system according to a first preferred embodiment of the present invention.

FIG. 1 is a schematic of an integrated vehicle stability control system 10 for controlling vehicle stability according to a first preferred embodiment of the present invention. The stability system 10 includes a steering system 11 and slip control braking system 13. Preferably, the steering system 11 includes an electric assist steering control unit 12 for controlling the assisted steering torque generated by an electric assist steering motor 14. Alternatively, other types of steering assist devices may be used such as a device powered by hydraulic power or pneumatic power. In addition, the steering system may include a steer-by-wire steering system. The electric assist steering motor 14 is operatively coupled to a steering wheel 18 for providing steering assist torque to steerable wheels 20 of the vehicle.

The electric assist steering control unit 12 receives input data from a torque and angle sensor 16 for determining the present steering wheel angle and steering torque applied to the steering wheel 18. In response to data received by the torque and angle sensor 16 and in combination with inputs from other sensed devices, the electric assist steering control unit 12 determines whether a vehicle instability condition is occurring. An output control signal is generated in response to an occurring vehicle instability condition and is provided to the electric assist steering motor 14 to generate a steering torque to compensate for the vehicle instability condition for maintaining vehicle stability. The electric assist steering motor 14 generates a steering torque autonomously (i.e., torque overlay) on the steering system independent of the steering torque that the driver is applying.

The slip control braking system 13 includes a slip control braking unit 22 for controlling vehicle instability through vehicle braking. Such braking stability operations include ABS, TC, and VSC. The slip control braking unit 22 is coupled to a head control unit (HCU) 24. The HCU 24 is operatively coupled to a front vehicle left brake 26, a front vehicle right brake 28, a rear vehicle left brake 30, and a rear vehicle right brake 32 for applying a braking torque to a front vehicle left wheel 36, a front vehicle right wheel 38, a rear vehicle left wheel 40, and a rear vehicle right wheel 42, respectively. Speed sensor 34 and a yaw sensor 36 are communicably connected to the slip control braking unit 22 for providing data concerning vehicle driving conditions to assist in determining vehicle instability conditions.

The slip control braking unit 22 receives data signals from the speed sensors 34 concerning wheel speeds from vehicle wheels 36, 38, 40, and 42. Based on the individual wheel speeds or combination of wheels speeds thereof, the slip control braking unit 22 determines whether a slip condition is present. In addition, the slip control braking unit 22 monitors a yaw sensor 44 for determining the yaw of the vehicle. The slip control braking unit 22 receives the input data from the speed sensors 34 and yaw sensor 44 and determines a braking strategy for correcting the vehicle slip condition in response thereto. The slip control unit 22 outputs control signals to various isolation valves and dump valves (not shown) within the HCU 24 for independently and selectively pressurizing and controlling the braking fluid applied to each of the vehicle brakes 26, 28, 30, and 32.

Under certain vehicle instability conditions, it may be desirable to cooperatively utilize the electric steering control unit 12 and the slip control braking unit 22 to regain vehicle stability when the vehicle instability condition is occurring. An example of a condition in which both units are cooperatively utilized is when the vehicle is traveling along a split-mu road surface. As discussed earlier, applying a high braking force to a respective front wheel in contact with the high-mu road surface while the vehicle is unstable may cause a vehicle spin-out. As a result, a high braking force (i.e., increased pressure above a predetermined threshold) is applied to a respective vehicle brake only after a determination is made that the yaw angle and steering wheel angle of the vehicle satisfy predetermined conditions indicative of vehicle stability. Vehicle braking on the split-mu road surface will produce a yaw about a vertical axis of the vehicle in a first direction. A torque overlay is applied via the electric steering assist motor 14 in an opposite direction of the yaw produced by the vehicle braking. If a net yaw angle (or yaw force) of substantially zero is produced from the yaw forces generated by the vehicle braking and applied steering assist, then the vehicle is conditionally stabile such that a relatively more aggressive braking strategy may be applied on the split-mu braking surface.

Figure 2:
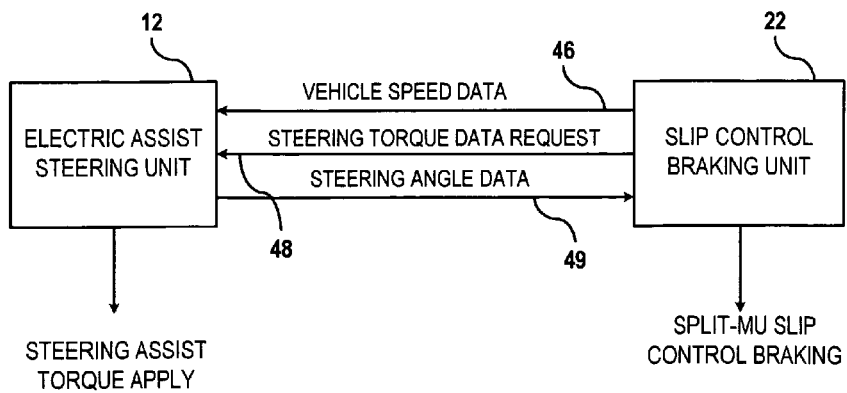
FIG. 2 is a block diagram of a control system according to first preferred embodiment of the present invention.

FIG. 2 illustrates a communication block diagram between the electric assist steering system and the slip control braking system. The slip control braking unit 22 identifies the split-mu road surface. The split-mu road surface is preferably identified by sensing the wheel speeds of two or more vehicle wheels on opposing sides of the vehicle. If a braking force is evenly applied to all vehicle brakes, the vehicle wheels traveling along the high-mu road surface will have a slower deceleration rate than the vehicle wheels traveling along the low-mu road surface. A predetermined deceleration threshold rate is known for the vehicle traveling at a respective velocity and having a respective braking force applied to the vehicle brakes. If the deceleration rate of a respective wheel is greater than the predetermined threshold rate, then it is decided that the respective wheel is traveling on a low-mu surface. If the deceleration rate of a respective wheel is less than the predetermined threshold rate, then the respective wheel is decided to be traveling on high-mu surface. As a result, if one or both wheels on a first side of the vehicle (i.e., front left wheel 36 and rear left wheel 40) have a deceleration rate slower than the predetermined threshold rate and one or both wheels on a second side surface of the vehicle (i.e., front right wheel 38 and rear left wheel 42) have a deceleration rate greater than the predetermined threshold rate, then a determination is made that the vehicle is traveling along a split-mu road surface. In alternative embodiments, other methods may be used to identify the split-mu road surface.

Once the split-mu road surface is identified, the electric assist steering control unit 12 and slip control braking unit 22 cooperatively exchange data to determine whether high braking torques may be applied to stabilize the vehicle. The slip control braking unit 22 provides vehicle speed data 46 and requests steering torque data 48. The electric assist steering unit 12 evaluates the request, applies a steering assist torque and sends steering angle data 49 to the slip control braking unit 22. The slip control braking unit 22 evaluates the steering angle and determines whether an aggressive or non-aggressive slip control braking strategy should be applied for braking on the split-mu road surface in response to the steering wheel angle data received.

An aggressive braking strategy includes applying a braking pressure greater than a predetermined braking pressure to at least one vehicle brake operatively adapted to a respective wheel that is traveling on the high-mu surface. A braking pressure less than the predetermined braking pressure is applied to the other vehicle brakes operatively adapted to the other vehicle wheels. For example, if both vehicle wheels on the left side of the vehicle are traveling on a high-mu road surface and both vehicle wheels on the right side of the vehicle are traveling on a low-mu road surface, then the elevated braking pressure may be applied to only the left front vehicle brake associated with the left front vehicle wheel and the lower braking pressure is applied to the remaining vehicle brakes associated with their respective wheels. Alternatively, elevated braking pressure may be applied to the both the left front and left rear vehicle brakes on the high-mu road surface and lower braking pressure applied to the right front and right rear vehicle brakes on the low-mu road surface. Braking pressure as used herein is relative a fluid pressure and fluid flow rate applied to a vehicle brake actuator for applying a braking torque on a vehicle wheel. Alternatively, braking pressure may include a pneumatic or electromagnetic force applied to a vehicle brake actuator for applying a braking torque on a vehicle wheel.

A non-aggressive braking strategy includes applying the lower braking pressure relative to the predetermined braking pressure to all the vehicle brakes operativley adapted to their respective wheels vehicle wheels.

Figure 3:
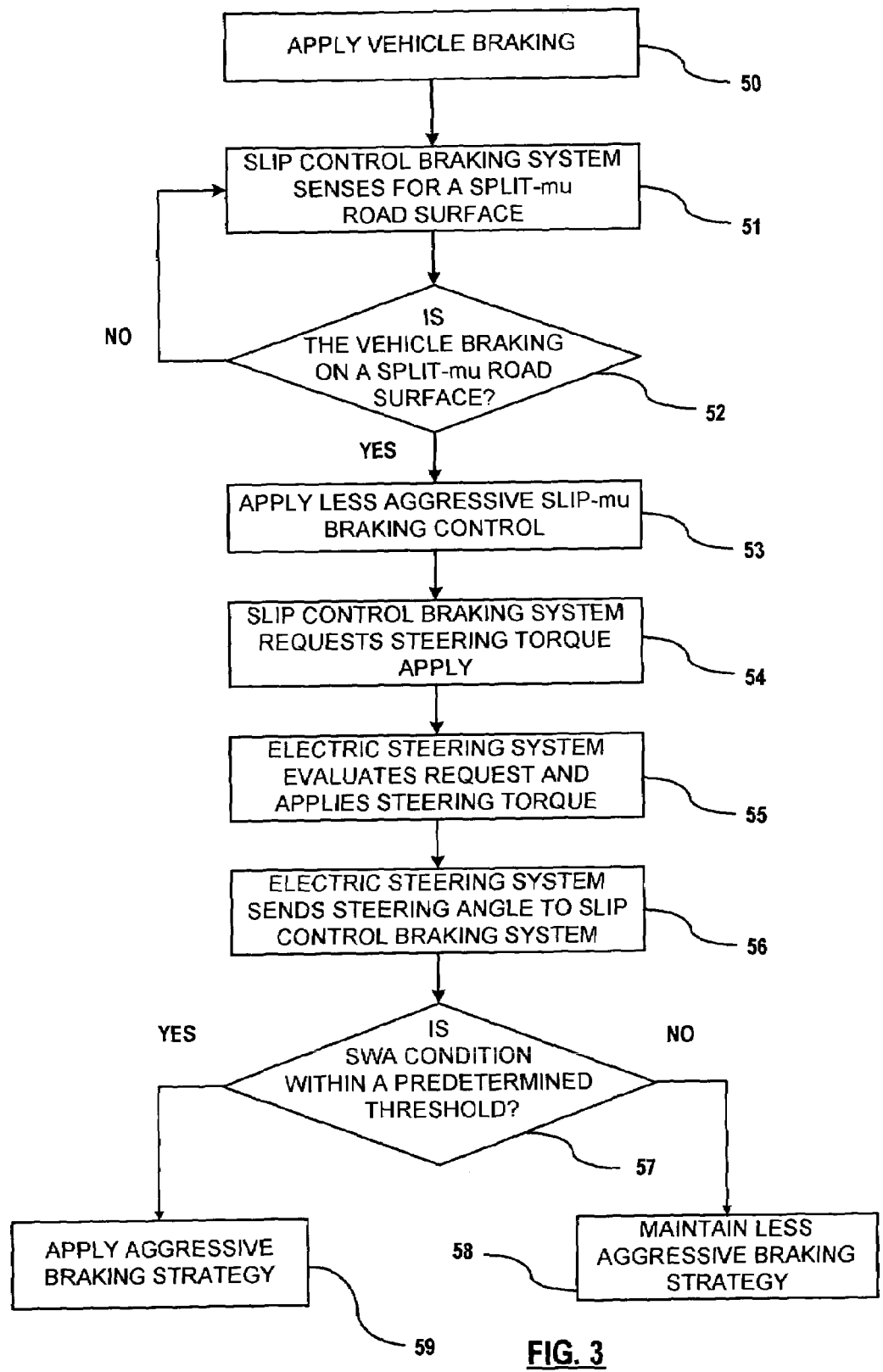
FIG. 3 is a method for applying vehicle stability according to a first preferred embodiment of the present invention.

FIG. 3 illustrates a method for applying vehicle stability control strategy according to a first preferred embodiment of the present invention. In step 50, a driver of a vehicle actuates a vehicle brake pedal mechanism for applying braking torque to the wheels of the vehicle traveling in motion. In step 51, the slip control braking system senses for a split-mu road surface while vehicle braking is applied to the respective wheels. As discussed earlier, the vehicle braking on a split-mu road surface occurs when the vehicle brakes are applied and at least one respective tire coupled to its respective wheel is in contact with a high-mu road surface and at least one next respective tire coupled to its respective wheel is in contact with a low-mu road surface. If braking is applied to a vehicle traveling along the split-mu road surface, the vehicle will have a tendency to yaw in the direction of the respective front wheel (tire) in contact with the high-mu surface.

In step 52, a determination is made whether the split-mu road surface is detected. If a determination is made that the vehicle is not braking on a split-mu road surface, then the slip control braking unit returns to step 51 to continue to sense for whether the vehicle is braking on a split-mu road surface. If the determination is made that the vehicle is braking on a split-mu road surface, then in step 53, the slip control braking unit applies a non-aggressive braking strategy. In step 54, the slip control braking unit requests that the electric assist steering unit perform a steering torque apply. In step 55, the electric assist steering unit evaluates the request by the slip control braking unit and applies a steering assist torque (torque overlay) to correct the vehicle from yawing during vehicle braking on the split-mu road surface.

In step 56, the electric steering system sends the steering wheel angle data to the slip control braking unit. In step 57, the slip control braking unit evaluates the steering wheel angle along with other input data such as the yaw angle and determines if the steering wheel angle condition is within a predetermined steering wheel angle threshold. If the determination is made that the steering wheel angle condition is not within the predetermined threshold, then the non-aggressive braking strategy is maintained in step 58. If the determination is made that the steering wheel condition is within the predetermined threshold, then the aggressive braking strategy is applied in step 59.

Applying an aggressive braking strategy when the steering wheel condition is not within the predetermined threshold could cause a vehicle spin out. Applying the aggressive braking strategy in cooperation the steering assist torque (torque overlay) when the steering wheel condition is within the predetermined threshold decelerates the vehicle at a faster rate while maintaining vehicle stability and shortens the stopping distance in comparison to the non-aggressive braking strategy.

Figure 4:
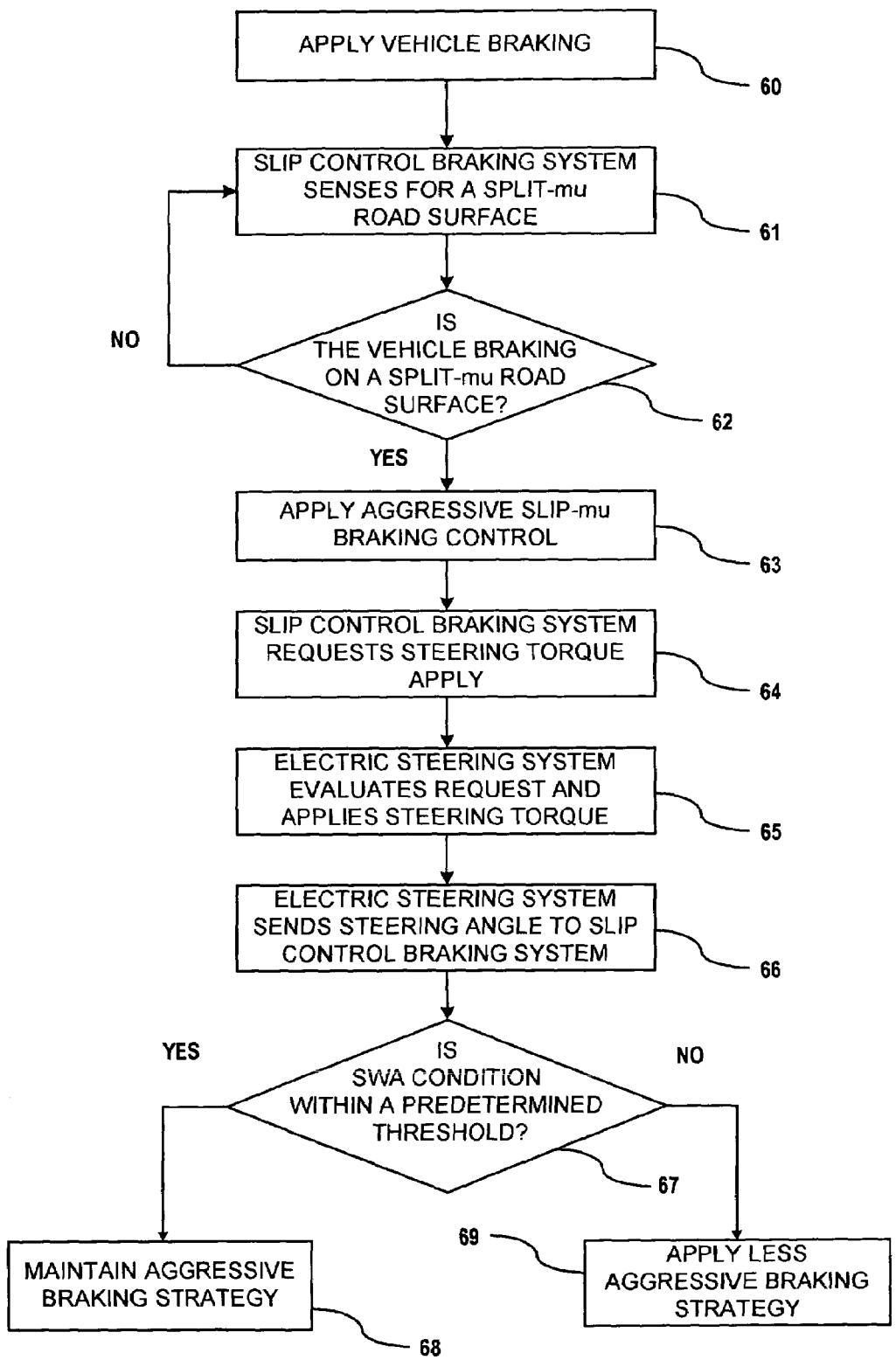
FIG. 4 is a method of applying vehicle stability according to a second preferred embodiment of the present invention.

FIG. 4 illustrates a method for applying vehicle stability control strategy according to a second preferred embodiment of the present invention. In step 60, a driver of a vehicle actuates a vehicle brake pedal mechanism for applying vehicle braking to a vehicle traveling in motion. In step 61, the slip control braking system senses for a split-mu road surface while vehicle braking is being applied to the respective wheels. In step 62, a determination is made whether a vehicle is braking on a split-mu road surface. If a determination is made that the vehicle is not braking on a split-mu road surface, then the slip control braking unit returns to step 61 to continue to sense for whether the vehicle is braking on a split-mu road surface. If the determination is made that the vehicle is braking on a split-mu road surface, then in step 63, the slip control braking unit applies an aggressive braking strategy. In step 64, the slip control braking unit requests that the electric assist steering unit perform a steering torque apply. In step 65, the electric assist steering unit evaluates the request by the slip control braking unit and applies a steering assist torque (torque overlay) to correct the vehicle from yawing during vehicle braking on the split-mu road surface.

In step 66, the electric steering system sends the steering wheel angle data to the slip control braking unit. The slip control braking unit evaluates the steering wheel angle along with other input data such as the angle and determines if the steering wheel condition is within a predetermined threshold, in step 67. If the determination is made that the steering wheel condition is not within the predetermined threshold, then the slip control braking system applies the non-aggressive braking strategy in step 68. If the determination is made that the steering wheel condition is within the predetermined threshold, then the slip control braking system maintains the aggressive braking strategy in step 69.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for providing vehicle stability control for a vehicle, said vehicle including a slip control braking system for applying independent braking pressure to respective vehicle brakes of said vehicle, said vehicle further including a steering system for applying steering intervention for stability control, said method comprising the steps of:

detecting a split-mu road surface;

applying a steering assist torque to said steering system in response to detecting the split-mu road surface, the steering assist torque being independent of a steering torque applied by a driver of said vehicle;

determining whether a steering wheel angle condition is within a predetermined threshold, said steering wheel angle condition comprising a steering wheel angle and a yaw angle of said vehicle; and applying an aggressive braking strategy if said steering wheel angle condition is within said predetermined threshold, else applying a non-aggressive braking strategy.

2. The method of claim 1 wherein said step of detecting a split-mu road surface includes applying a braking torque to said respective vehicle wheels and detecting a deceleration rate slower than a predetermined deceleration rate threshold for a first front wheel and a first rear wheel, and detecting a deceleration faster than said predetermined deceleration rate threshold for a second front wheel and a second rear wheel.

3. The method of claim 2 wherein said aggressive braking strategy includes applying a braking pressure greater than a predetermined braking pressure to a first front vehicle brake and applying a braking pressure less than said predetermined braking pressure to a second front vehicle brake and to a first rear vehicle brake and a second rear vehicle brake.

4. The method of claim 2 wherein said aggressive braking strategy includes applying a braking pressure greater than a predetermined braking pressure to a first front vehicle brake and a second rear vehicle brake and applying a braking pressure less than said predetermined braking pressure to a second front vehicle brake and a second rear vehicle brake.

5. The method of claim 1 wherein said non-aggressive braking strategy includes applying a braking pressure less than a predetermined braking pressure to said respective vehicle brakes.

6. The method of claim 1 wherein applying a steering assist torque includes applying a torque overlay to said steering system.

7. The method of claim 1 wherein determining a steering wheel angle condition includes determining whether a steering wheel condition is within a predetermined steering wheel angle threshold.

8. The method of claim 1 wherein determining a steering wheel angle condition includes determining whether a first directional vehicle yaw force produced by a driver in response to said applied steering assist torque is in opposition to second directional vehicle yaw force produced by said slip control braking system.

9. The method of claim 8 wherein said first directional yaw force and said second directional yaw force produce a net yaw force of substantially zero.

10. The method of claim 9 wherein said first directional yaw force and said second directional yaw force produce a yaw angle of substantially zero.

11. A vehicle stability control system of a vehicle comprising:
    a slip control braking system for applying independent braking pressure to respective vehicle brakes of said vehicle; and
    a steering system for applying steering intervention for stability control;
    wherein said slip control braking system detects a split-mu road surface and said steering system applies a steering assist torque in response to detecting said split-mu road surface, said steering assist torque being independent of a steering torque applied by a driver of said vehicle; and
    wherein said slip control braking system determines whether a steering wheel angle condition is within a predetermined threshold and applies an aggressive braking strategy if said steering wheel angle condition is within said predetermined threshold, else applying a non-aggressive braking strategy, said steering wheel angle condition comprising a steering wheel angle and a yaw angle of said vehicle.

12. The vehicle stability control system of claim 11 wherein said slip control braking system includes a slip control braking unit and a head control unit, said slip control braking unit controls said head control unit for applying said independent braking pressure to said respective vehicle brakes.

13. The vehicle stability control system of claim 11 wherein said steering system includes an electric assist steering control unit and an electric assist steering motor, said electric assist steering control unit controls said electric assist steering motor for applying said steering intervention for stability control.

14. The vehicle stability control system of claim 11 further comprising a torque and angle sensor for determining a steering wheel torque applied and steering wheel angle of said vehicle.

15. The vehicle stability control system of claim 11 further comprising a speed sensor and a yaw sensor for sensing vehicle speed and yaw of said vehicle.

16. The method of claim 1 wherein said steering system includes an electric steering system.

17. The method of claim 16 wherein said electric steering system includes an electric assist steering system having an electric assist steering motor for providing an assisted steering torque.

* * * * *